United States Patent
Mueller et al.

(10) Patent No.: US 10,343,281 B2
(45) Date of Patent: Jul. 9, 2019

(54) POWERLINE-CONTROLLED ELECTRIC DRIVE INVERTERS

(71) Applicant: Infineon Technologies Austria AG, Villach (AT)

(72) Inventors: Clemens Mueller, Munich (DE); Daniel Scharfen, Hebertshausen (DE)

(73) Assignee: Infineon Technologies Austria AG (AT)

( * ) Notice: Subject to any disclaimer, the term of this patent is extended or adjusted under 35 U.S.C. 154(b) by 0 days.

(21) Appl. No.: 15/992,444

(22) Filed: May 30, 2018

(65) Prior Publication Data
US 2018/0345499 A1 Dec. 6, 2018

(30) Foreign Application Priority Data
May 30, 2017 (DE) .......................... 10 2017 005 137

(51) Int. Cl.
| | |
|---|---|
| H02P 31/00 | (2006.01) |
| B25J 9/16 | (2006.01) |
| H02P 5/747 | (2006.01) |
| H02P 3/02 | (2006.01) |
| B25J 9/12 | (2006.01) |
| H02P 1/02 | (2006.01) |
| B25J 9/00 | (2006.01) |

(52) U.S. Cl.
CPC ............ B25J 9/1674 (2013.01); B25J 9/126 (2013.01); H02P 1/026 (2013.01); H02P 3/02 (2013.01); H02P 5/747 (2013.01); Y10S 901/23 (2013.01)

(58) Field of Classification Search
USPC ............................. 318/565–567, 568.11, 626
See application file for complete search history.

(56) References Cited

U.S. PATENT DOCUMENTS

| | | | | |
|---|---|---|---|---|
| 4,696,574 | A * | 9/1987 | Penney | B25J 13/089 356/614 |
| 4,943,759 | A * | 7/1990 | Sakamoto | B25J 9/1633 318/434 |
| 5,227,707 | A * | 7/1993 | Mitomi | B25J 9/1682 318/568.1 |
| 2002/0169522 | A1 * | 11/2002 | Kanno | B25J 9/1666 700/245 |
| 2006/0052901 | A1 * | 3/2006 | Nihei | B25J 9/1666 700/245 |

(Continued)

FOREIGN PATENT DOCUMENTS

| | | |
|---|---|---|
| DE | 29 46 441 A1 | 5/1981 |
| DE | 695 18 293 T2 | 3/2001 |

(Continued)

*Primary Examiner* — Bentsu Ro
(74) *Attorney, Agent, or Firm* — Design IP

(57) ABSTRACT

A robotic system is proposed whereby the system comprises drivers which integrate the power switches and communications electronics for communicating over power lines or wirelessly or over another shared communications channel. In a robotic system comprising such drivers, one or more central controllers communicate with at least one actuator driver across a communications channel, wherein the communications channel is subject to interference caused by an actuator, and wherein at least one of the communication and the operation of the actuators is modified in anticipation of interference occurring such that reliable communication can be assured.

17 Claims, 9 Drawing Sheets

(56) References Cited

U.S. PATENT DOCUMENTS

| | | | | |
|---|---|---|---|---|
| 2007/0164695 | A1* | 7/2007 | Hagihara | B25J 9/1602 318/568.11 |
| 2008/0024083 | A1* | 1/2008 | Yamaguchi | G05B 19/4061 318/569 |
| 2017/0144300 | A1* | 5/2017 | Oumi | B25J 9/161 |

FOREIGN PATENT DOCUMENTS

| | | |
|---|---|---|
| DE | 10 2004 018 370 B4 | 1/2006 |
| DE | 10 2007 038 119 A1 | 7/2008 |
| EP | 2 681 632 B1 | 1/2014 |

\* cited by examiner

POWERLINE-CONTROLLED ELECTRIC DRIVE INVERTERS

FIELD

The present invention provides improvements for motor control systems such as are used for industrial robots. In particular, the invention enables a network of motors controlled by drivers such as variable frequency drives to be efficiently established and operated.

BACKGROUND

Electrically operated robots find wide application in industry. Variable frequency drive or variable speed drive techniques allow robots to be built with electric motors that offer many degrees of freedom and can easily be controlled by a computerized system. Each such motor currently requires a source of electricity and a connection to a controller which can operate the drive electronics. The electrical supply often requires thick cables to carry the necessary current for operation, while the controller connection requires a separate cable or cables.

When the electric motor connected to the supply and control cables is movable, then the cables must move with the motor. In the case of a robotic arm, multiple motors may each be cabled, and all cables must move with the arm.

Interference on the electrical supply may occur in these robotic systems which is caused by the operation of the electric motors and their related inverters. For the high-current, high-power motors often used in robotics, there can be substantial "noise" or interference on the supply connections. There is also a need for improved robotic systems that are less There is a need for a more reliable, agile and flexible system.

SUMMARY

A robotic system is proposed whereby the system comprises drivers which integrate the power switches and communications electronics for communicating over power lines or wirelessly or over another shared communications channel. In a robotic system comprising such drivers, one or more central controllers communicate with at least one actuator driver across a communications channel, wherein the communications channel is subject to interference caused by an actuator, and wherein at least one of the communication and the operation of the actuators is modified in anticipation of interference occurring such that reliable communication can be assured.

DETAILED DESCRIPTION

Figure 1:
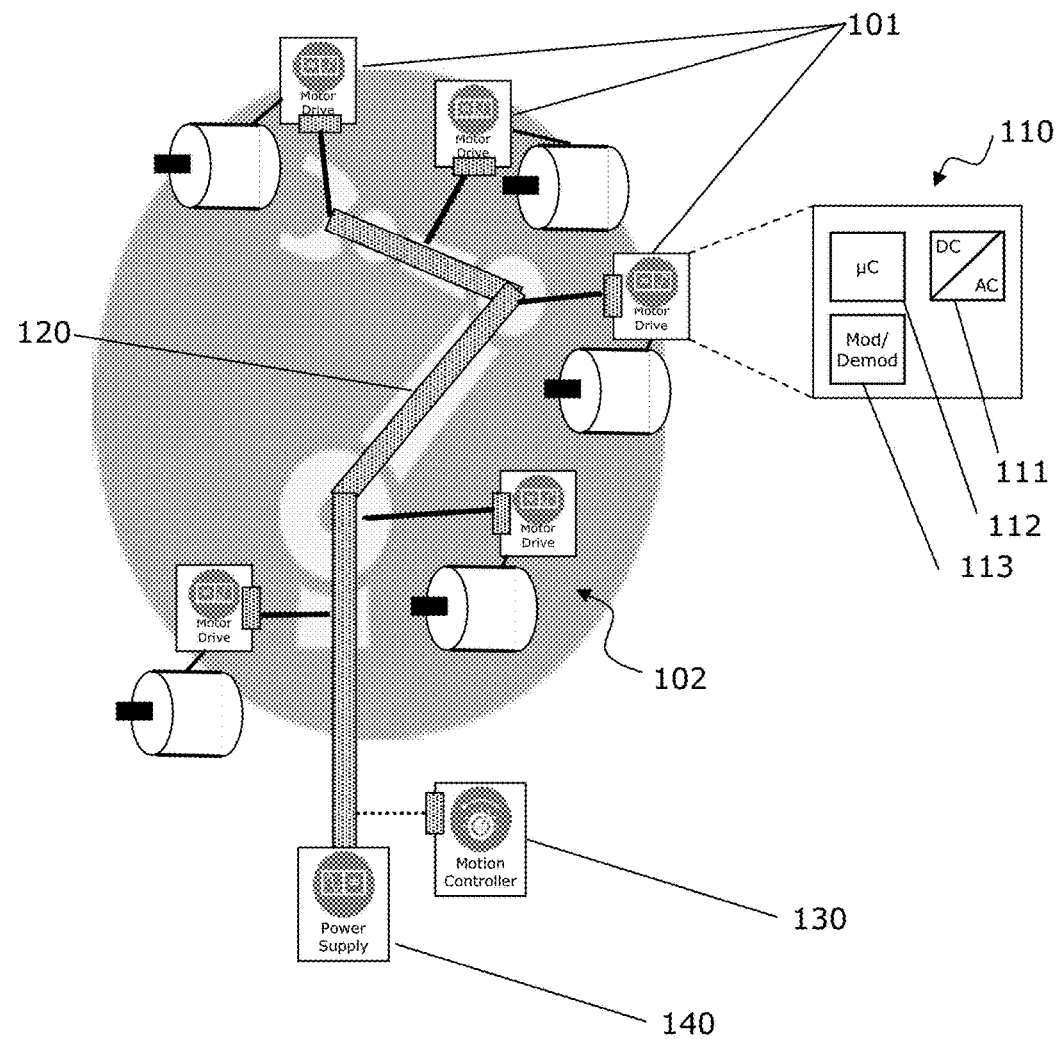
FIG. 1 shows an embodiment of a robotic system with motors and drivers.

Electrically operated robots find wide application in industry. Variable frequency drive or variable speed drive techniques allow robots to be built with electric motors that offer many degrees of freedom and can easily be controlled by a computerized system. Each such motor currently requires a source of electricity and a connection to a controller which can operate the drive electronics. The electrical supply often requires thick cables to carry the necessary current for operation, while the controller connection requires a separate cable or cables.

When the electric motor connected to the supply and control cables is movable, then the cables must move with the motor. In the case of a robotic arm, multiple motors may each be cabled with supply and control cables, and all cables must move with the arm.

One possibility for improved control of electric motors, is to co-locate the driver or "inverter" or "frequency converter" with the electric motor, and to communicate control information from a central controller computer system to the driver using Power-Line Communication (PLC). Power lines or cables are needed to supply each driver and motor with electrical energy, and these power lines may also be used to carry control information to the co-located driver for the motor.

A co-located driver can be implemented by integrating control, communication, and electrical power switches into a single module, board, or even a single IC device. The driver or inverter can, for example, convert a DC supply (using two cables) to the three-phase AC electrical supply used to operate the electric motor.

A co-located driver has the advantage of reducing the volume and or frequency of communication to the central controller. An instantaneous or cycle-by-cycle communication or supply of current is needed between the driver and the motor; communication between a central controller and a driver can be on the basis of complete operations or even instructions (e.g. "turn the arm 90°").

It may also be desirable to allow easy extension with additional motors and drivers, and perhaps also additional central controllers. This may be achieved when multiple drivers can share the power supply and the connection or communications channel to the central controller, for example in a bus configuration. Thus one can enable a modular robotic system which can be easily configured and reconfigured with motors and other actuators.

With the advantageous systems described above, however, interference on the electrical supply may occur caused by the operation of the electric motors and their related inverters. For the high-current, high-power motors often used in robotics, there can be substantial "noise" or interference on the supply connections. In the case of power-line communications, the integrity of the communication must be insured even in the presence of this interference. The integrity of the communication is even more important when safety of operation is a consideration, as may be the case in robotics. Reliable communication from the central controller to the drivers must be guaranteed such that the central controller can stop any and all operations in a way that insures safety. And reliable communication from drivers or sensors to the central controller must be guaranteed if a driver or sensor may signal abnormal operation or a dangerous condition to the central controller.

A robotic system may comprise multiple actuators with electric motors and corresponding drivers or "inverters", as shown in FIG. 1. The drivers are also called "frequency inverter" or "frequency converter" or Variable Speed Drive or Variable Frequency Drive. Each actuator 102 may comprise a driver 101. Within a single driver 101 are elements shown in the detail view of the driver 110, namely a DC-to-AC converter 111, a microcontroller or other programmable control device "μC" 112, and a communications transceiver or modulator/demodulator "Mod/Demod" 113. The dc-to-ac converter will also perform the frequency conversion, or "inversion", such that the AC current for the motor has the appropriate frequency and phase for the desired operation. A power supply connection "DCbus" 120 provides electrical power to the respective drivers 101. A central power supply 140 supplies power to all actuators via the power connection 120. A central controller 130 communicates with the individual drivers 101, 110 to operate the motors.

In operation, the electric motors of the actuators are controlled by so called drivers or drive inverters, which provide the necessary electrical field to bring the motor into motion, for example a rotating field. To operate the motor in terms of speed, torque, direction etc., the drive inverter may use special control and status signal information which might be exchanged through dedicated low voltage signal wires. If dedicated signal wires are used, the wires need to be routed to the motor in addition to the necessary power wiring, which supplies the motor with the required electrical power for operation. The basic power wiring itself could consist of two wires in case of DC supply or single phase AC supply voltage. In case of three phase AC supply voltage at least 3 wires are needed for power supply. If the power is supplied as single- or three-phase AC, an additional rectifier stage will be required in front of the inverter. The control and status communication with the drive inverter adds another set of low voltage wires.

The electric motors themselves may be variable-speed motors or servo motors, or other electric motors as needed. Electric motors are associates with respective drivers, which supply the electricity according to parameters which serve to set the desired operation of the motor. For example, the operation of a variable-speed BLDC (Brushless DC) motor may be controlled using pulses of a specific frequency and duration or "width". Other parameters used to control a motor may be voltage or current. These parameters are typically optimized for a given speed, or for a given acceleration or torque, or for power efficiency.

The configuration as shown in FIG. 1 may exist in e.g. robotics applications where application and motor controllers are spatially distributed and a plurality (typically more than five or six) individual motors for positioning and actuator handling need to be connected. An actuator e.g. at the end of an arm may comprise something other than a motor, or include a motor and another electrically-operated element, for example a soldering or welding head or a heating or lightening element. which will be considered as being the equivalent of a motor. While any type of actuator can be used with the present disclosure, the description uses a motor as an example for an actuator. On top is the signal wiring for the exchange of status information provided by different types of sensors. The communication between the motor controllers and the application controller may be unidirectional or bidirectional as well as half- or full-duplex (all communication partners can transmit at the same time).

The communication between the central controller and the drivers may occur via different communication channel implementations. For example, the communication may occur over a communications channel, such as a separate communication bus (not shown), or wirelessly, or by communications signals superimposed on the power supply connection 120. In the latter case the communication occurs as Power Line Communication and the communication channel is the power line or power supply connection. A combination of communications channels may also be used, which may have advantages of increased bandwidth or increased reliability or improved integrity of communication. Particularly where safety of operation is a concern, it may be advantageous to have multiple parallel communications channels, whereby one channel may be able to serve as a backup for another channel, or be a redundant channel, or provide communication in the event of a transient or permanent failure of another channel. Power Line Communication operates over the same physical connections which supply power, so integrity of such communication may be considered both necessary and sufficient to insure control over actuators whenever the motors are operational. Should the power line (e.g. a power cable) break, then neither can the motor operate nor can the central controller communicate with the driver.

Figure 2:
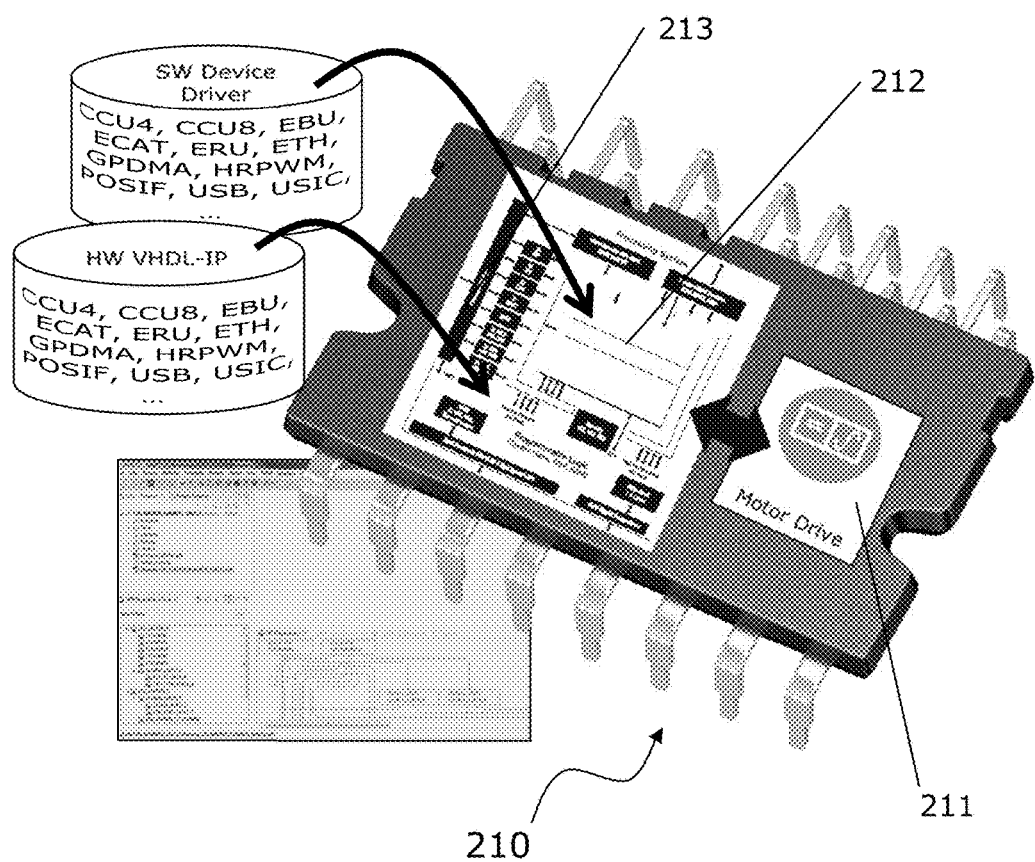
FIG. 2 shows an embodiment of an integrated driver.

FIG. 2 shows an integrated driver component such as element 110 in FIG. 1. The integrated driver component 210 comprises a microcontroller 212, a transceiver 213, and the DC-to-AC converter or "inverter" 211. The driver is connected between the power lines and the motor. The transceiver is coupled to the power lines to send and receive information, and the dc-to-ac converter is coupled to the power lines to receive power. The DC-to-AC converter in turn provides electrical power to the motor in order to drive the desired operation. An inverter may also be configured to recuperate mechanical energy as electrical energy in case of motor braking. In the case of a Variable Frequency Drive for an AC motor, the driver will adjust the supply voltage and frequency to the motor to control its speed and torque.

Figure 3:
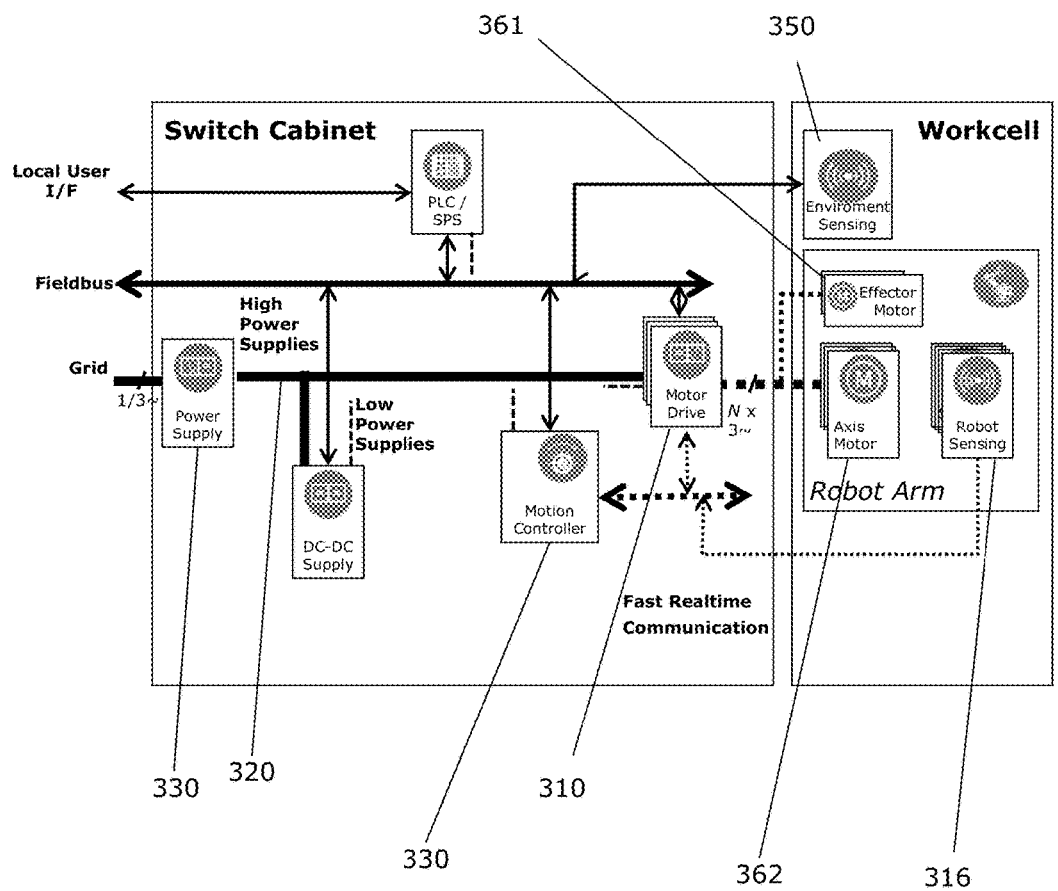
FIG. 3 gives details of the functions located in the drivers and central controller.

FIG. 3 shows a more detailed embodiment of the different functionalities corresponding to one workcell centered around a robot arm. The system also comprises sensors, such as a robot arm sensor 316 or a workcell sensor 316. The arm sensor 316 may communicate with the motor drive 310, which communicates in turn with the central controller 330. The workcell sensor 350 communicates with the central controller 330. Thus the arm sensor 316 communicates independently of the communications channel between driver and central controller. The workcell sensor may use the same channel, such as power-line communication, as do drivers to communicate with the central controller. In an alternate embodiment, a sensor may have an independent communications channel to the central controller.

Power is supplied to the central controller 330 and the drivers 310 via a supply bus 320. This supply bus may be a DC bus or an AC bus. This bus supplies the actuators with the power which is converted by the drivers or inverters to operate the motors. The bus comprises supply lines which may also be used as communications channel for power-line communication. In this way, power to each actuator and communication with each actuator can be assured with a connection to a single bus. Additional actuators can be added without adding cables or wires.

The variety of motors in different sizes, such as an effector motor 361 and an axis motor 362, may lead to a variety of sources of electrical interference with different characteristics. Each source of interference can impact the integrity of communication between the central controller(s) and the individual drivers or "inverters". Each driver may introduce distortion on the power supply, especially since the driver may typically represent a non-linear load. Depending on the modulation scheme used, there may be interference caused or generated by the supply from driver/"inverter" to motor. For example, pulse-width modulation (PWM) uses series of pulses which may cause interference; the same may be true for effects such as back-EMF. In addition, when IGBT's or MOSFET's are used as power switches to switch the power supplied to the motor, their high switching speed may induce harmonic voltage and current disturbances on the supply lines. The edges of pulses generated with IGBT's may be particularly "sharp" or have a very fast transition time. If there is an impedance mismatch between the driver and the motor, there may also be reflective voltage waves, which can cause further electrical interference. The interference itself may take the form of conducted electro-magnetic interference (EMI) in the supply cables, or radiated EMI.

Motors may be driven by pulses with slew rates of 5 kV/µs or higher, and with frequencies below 10 KHz, or with frequencies in the range of 20 KHz, or with frequencies higher than 20 kHz. There may also be other sources of interference which share the same power supply, such as lighting controllers or power supplies for sensors, heaters, welding equipment, etc. In the case of wireless communication, the other sources of interference may not share the same power supply, but be in physical proximity or otherwise cause interference. In the following, these will also be considered as actuators.

The interference caused or generated by an actuator, or a motor/driver combination, may depend on the operation of the motor. Changes in the motor speed or motor torque may cause transient increases in the interference. In particular, starting or stopping the motor may cause interference, both conducted and radiated. Electric motors themselves may generate EMI if they are brushed, i.e. with brushes that contact a commutator to direct the electrical flow through the windings of the motor; each time contact is made or broken, there may be an EMI event. Stepper motors may also cause substantial EMI, which may be correlated to changes in the position of the rotor. Other equipment such as arc welding stations may also cause EMI when in operation.

It is envisioned that the central controller(s) and/or the drivers will have an influence over the sources of interference, or can at least obtain information about upcoming interference events, and therefore can anticipate occurring interferences before the interference can impact a communication. As an example, if the starting or stopping of a motor will cause interference, then the central controller may, before commanding that the motor be started or stopped, finish a communication or interrupt a communication or change a characteristic of the communications channel such as the frequencies used or the coding scheme or the timeslots used. The communications channel may also be shifted e.g. from power-line communication to wireless communication or vice-versa, to avoid an anticipated interference. The central control may also delay the starting or stopping of the motor (or other actuator). The delay may be for a predetermined duration, for example until the communication is finished or paused. Modifying this communication and/or the operation of the actuators assures a more reliable communication.

A driver may use information about upcoming interference to modify the communication, for example communication patterns, and may signal the upcoming interference to other drivers and/or the central controller. Advantageously, an arc welding apparatus in proximity may signal an upcoming welding event. Much as construction workers may speak before and after using a jackhammer, and use hand signs while the jackhammer is in operation, the actors in a robotic system (central controller, drivers) may pattern their communication around upcoming or ongoing interference. In the same manner, if it becomes apparent to construction workers while using a jackhammer that communication is needed, hand signals may be used to signal that the jackhammer be stopped or paused; likewise, an actor in a robotic system may signal that communication with a bandwidth higher than possible given a certain interference is needed, in order to achieve that the interference source be stopped or modified.

It is possible that the operation of the actuator is modified by changing the operating parameters of a motor or other actuator in anticipation of the interference. For example, a driver may modify parameters such as the drive current or frequency supplied to a motor in order to reduce the interference which is generated. This may be done autonomously by the driver or under the direction of the central controller. This may be done for a normal communication or in the case of an abnormal or emergency communication. The change in the supply to the motor may be done in such a way that the operation of the motor is not substantially impacted or modified, for example that the motor runs with slightly less efficiency while a communication is occurring.

Figure 4:
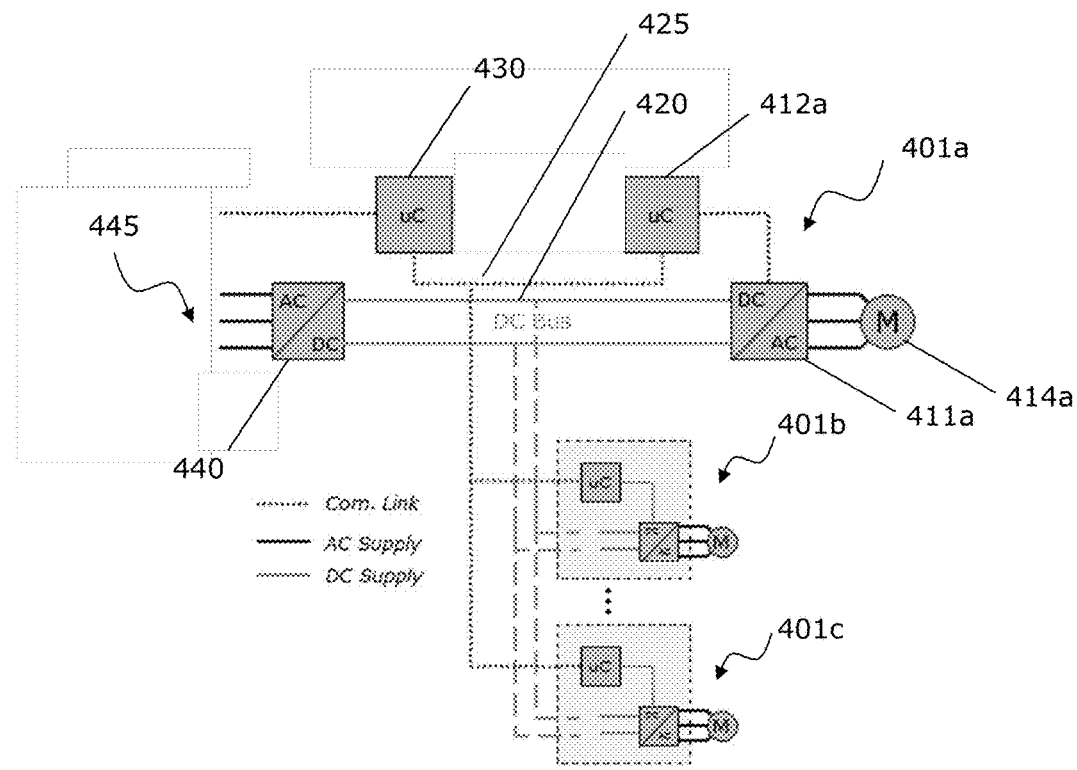
FIG. 4 shows an embodiment of a robotic system with a DC power distribution.

FIG. 4 shows one example of an embodiment where a DC power supply bus is used as a power supply to the actuators $401a$, $401b$, $401c$. Actuator $401a$ comprises an inverter $411a$ which converts the DC supply to a multi-phase AC for the motor, a microcontroller $412a$, and a motor $414a$. The power supply line 420 may be a DC bus which provides DC electrical power to the actuators $401a$, $b$, $c$. The communications channel 425 is not necessarily a separate physical entity, and is therefore shown as a dotted line. It may be implemented using power-line communications over the power supply line 420, or as a wireless connection, or as a combination of these or other methods. The central controller 430 communicates with the controller of each actuator $401a$, $b$, $c$, using the shared communications channel 425. This same shared channel carries the return communication to the central controller 430. Three-phase AC 445 is supplied to the power supply 440, which in turn supplies the DC power to the bus.

The described embodiment can reduce the required wiring effort for controlling the operation of an electric motor to the absolute minimum by integrating and layering application-to motor-controller communication on top of the (unavoidable) power lines using Power-Line Communication. Beyond the power wiring no extra wires are required for communication, thus eliminating the need for extra shielding and additional flexible cables to carry communication. This embodiment can also reduce manufacturing efforts and costs for a wiring harness. With the creation of a bus or bus-like bi-directional communication link using either a master-slave or multi-master configuration, a high number of individual motors or actuators can be connected. This maintains system scalability and increases system robustness for safety-critical applications: as long as there is a power supply connection for the motor operation, all connected motors can communicate amongst each other and with the central application controller at all times. This embodiment may enable a modular robotic system which can be easily configured and reconfigured with motors and other actuators.

The described embodiment can also improve system latency, as each motor can share emergency information with its neighbors directly without a need for a round-trip communication through the central application controller.

The application- to motor-controller communication may build on existing transmission principles for communicating over a power line (e.g. AV IEEE1901 "HomePlug", or G.hn "HomeGrid"), but may be extended. For example it may be relevant to consider modulation on power lines with an operating voltage potentially exceeding 380V as well as with much higher fault robustness and real-time capability in order to always guarantee safe motor operation. The necessary transceiver function may be integrated in or combined with a (smart) integrated power module (IPM) which provides the full drive inverter functionality. The transceiver itself must be capable of dealing with electrical environments which are determined by the required motor power and might include operating voltages which exceed 380V by orders of magnitude (depending on motor type and power class). There may be different transceiver options which are capable of dealing with either an AC or a DC motor supply voltage.

By combining power supply and communication over the same wire, the drive inverter's interface may be reduced to a total of 5 connectors: 2×DC-Input from supply side and 3×AC output directly to the electric motor. There is an alternative realization if the driver also realizes the rectifier part of the motor drive circuit and is fed from the power grid. In this case the communication may be modulated on the grid lines which supply the driver. In any case, the wiring overhead, which might be required for separate communication wires, is not needed in this embodiment. Any drive-based motor application can thus be directly controlled via the power supply lines. The DC-link or the grid lines, which were formerly used for power supply only, become the supply and communication backbone between the different motors and their drives within an application system such as an industrial robot.

Figure 5:
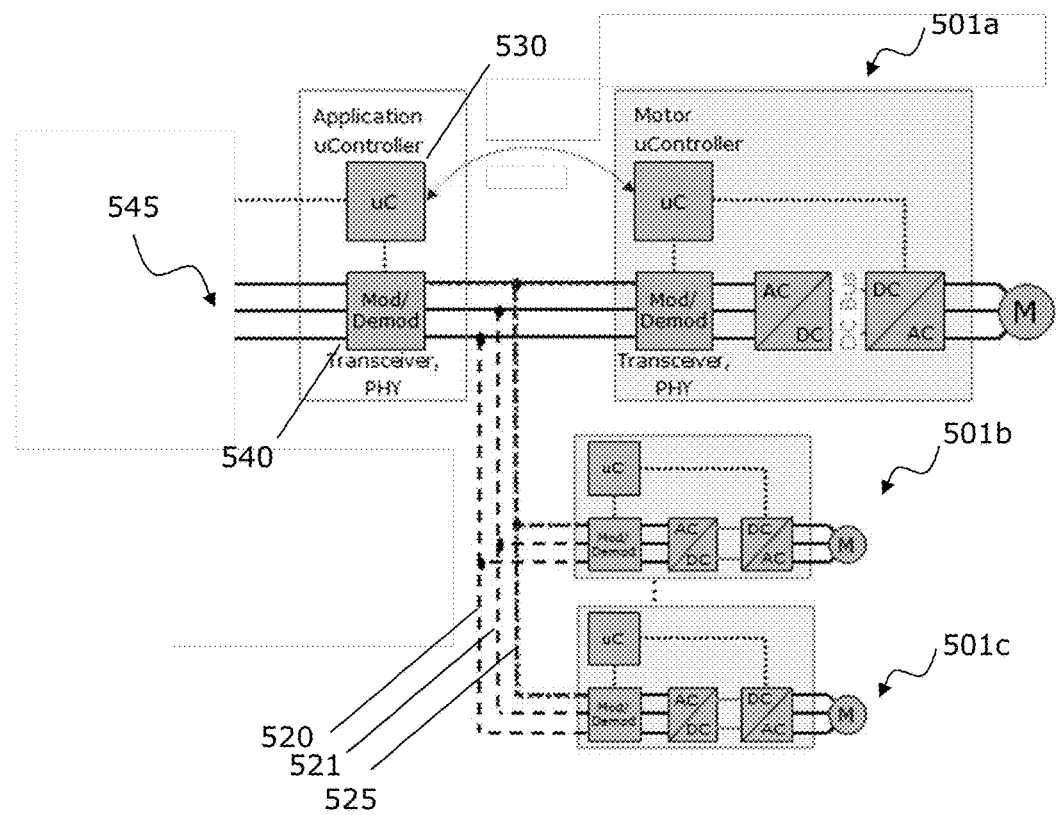
FIG. 5 shows an embodiment of a robotic system with a 3-phase AC power distribution.

FIG. 5 shows a similar embodiment to FIG. 4 but with an AC bus as the power line. The AC bus may comprise 3 power cables to supply 3-phase AC power, or 2 power cables to supply single-phase AC current. For power-line communication, the two cables of single-phase AC are comparable to the configuration for dc power. In the case of 3-phase or poly-phase power supply, the power-line communication should be either on a common phase or via couplers between phases.

The power supply line 520, 521, 525 is 3-phase AC, which is supplied to actuators may be a DC bus which provides DC electrical power to the actuators 501*a, b, c*. The communications channel 525 is one of the AC supply lines, which may be implemented using power-line communications over the power supply with an appropriate transceiver 540. The central controller 530 communicates with the controller of each actuator 501*a, b, c*, using the shared communications channel 525.

Figure 6:
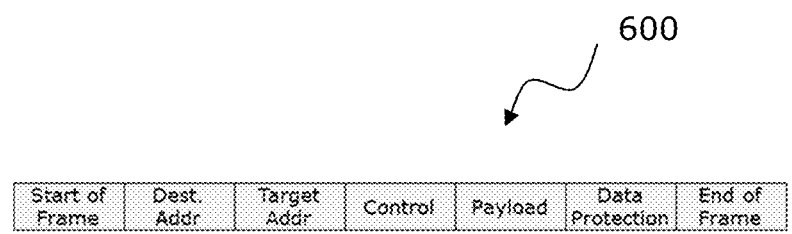
FIG. 6 shows the structure of a frame for communication.

Due to the difficult electrical environment for motor control caused e.g. by interference, advanced error detection and recovery as well as data redundancy algorithms may be used in order to ensure a stable communication link. This may be achieved by implementing a robust datagram-based protocol between the two communication controller entities of the application and the motor controller. FIG. 6 shows a communication message or datagram 600, which can be used in transmitting information between a central controller and an actuator. The logical communication link between application- and motor-controller consists of datagrams, which are being transferred over a modulated DC-bus. Robustness may be achieved by dedicating the majority of the transmitted information for guarding the motor-control-related payload in each datagram. In order to operate a motor, only a few bytes of control data are required, which may leave bandwidth available for additional measures to insure data integrity and error detection/correction (higher data throughput might only be required during reprogramming of the embedded controller: in this scenario the motor may not be in operation, which will allow the system to lower the bandwidth used to protect data integrity, and thus to increase throughput as needed).

The resulting system becomes more robust. There may be a reduced risk for broken wires if there are fewer wires. Extra shielding efforts related to EMI and mechanical robustness will only apply to the supply lines, which in return leads to reduced weight, less power consumption and thus less thermal stress. Fewer wires may also lead to less "stiffness" where wires or cables move with an actuator, or may lead to less weight to displace, leading to better motion dynamics. The range of trajectories or freedom of motion may also be improved with less wiring. In addition, with less wiring there may be less mechanical shielding required to protect against wear due to motion. Altogether, these effects may yield significantly lower manufacturing efforts and system costs. In addition the resulting motor control setup is suitable for scalable electric drive topologies within a bigger system context, as additional motor drive components can be added to the DC-bus or supply-line backbone without any additional wiring effort.

The use of frames or datagrams as shown in FIG. 6 may help to create significant system flexibility. When dedicated point-to-point electrical connections are used, the number of actuators is limited to the number of physical programmable logic controller (PLC) ports which the motor driver is connected to. The addressing of the motor driver via packet-based datagrams allows one to add motors to an existing configuration without changing the PLC—while the PLC must be capable of operating with datagrams (protocol layer required). An almost unlimited number of motors or other actuators is possible, subject only to each actuator having an address. The communication protocol between application running at the central controller and the motor driver must be optimized for robustness and real-time. Control information is bi-directionally transferred, from the application- to the motor-driver for steering the operation of the motor as well as status information (e.g. provided by motor sensors) which may travel in both directions.

The realization of the various datagrams is user defined in terms of size, format and purpose. FIG. 6 shows a typical datagram structure as it would be used in a multi-master bus configuration. The motor control or status information would be passed through the payload section of the datagram or a combination of control and payload sections. A user-specific message and control protocol, which is being sent over the communication channel, may be independently implemented in software.

Figure 7A:
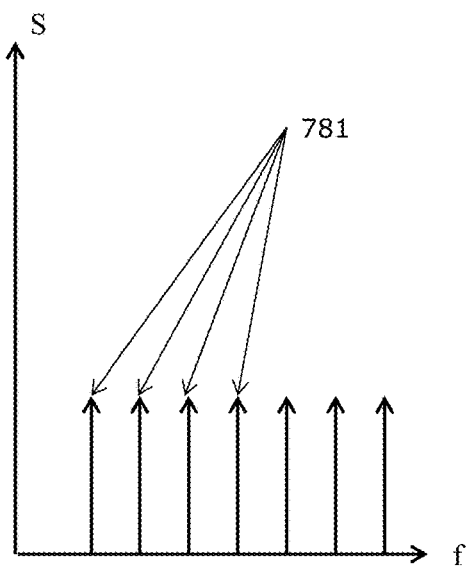
FIGS. 7a and 7b show ideal and realistic carrier frequencies.
Figure 7B:
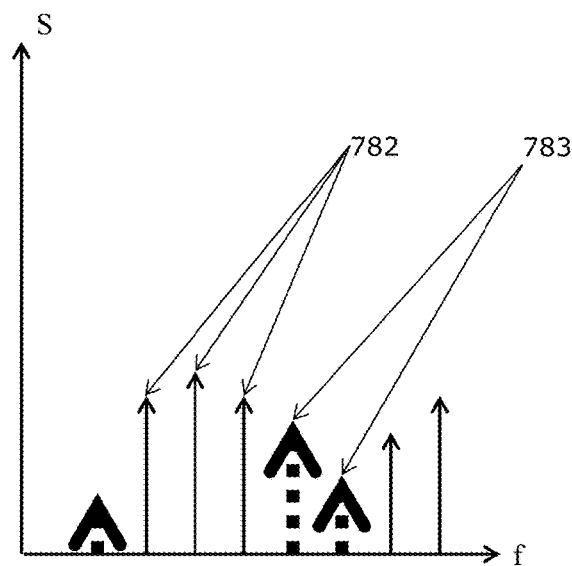

Communication may occur over a channel which uses Orthogonal Frequency-Division Multiplexing (OFDM), perhaps in combination with Quadrature Amplitude Modulation (QAM). In OFDM the available frequency range or band is divided into sub-carriers which are mutually orthogonal. The sub-carriers may be subject to interference or attenuation, which may often vary from one sub-carrier to another. In FIGS. 7*a* and 7*b* are shown two variants of an OFDM channel, where sub-carriers 781, 782 and 783 carry information. In FIG. 7*a* the channel is a theoretical channel, with no variation between the capacities of the different subcarriers; this is shown by the uniform height of the arrows 781 which represent sub-carriers. In FIG. 7b the channel is subject to attenuation and interference, which is shown by arrows of different height. Sub-carriers 782 are subject to varying attenuation, while sub-carriers 783 are subject both to varying attenuation and to interference. For the purpose of insuring communication bandwidth, attenuation and interference may be considered as equivalents. In different embodiments, the central controller(s) and drivers cooperate to use the available sub-carriers in a way that reliable communication can be achieved.

Different frequencies or "tones" may be used to modulate information onto the power supply. The information may be transmitted using schemes to modulate information onto one or more carriers such as OFDM (Orthogonal Frequency-Division Multiplexing) or QPSK (Quadrature Phase-Shift Keying), or more generally Frequency Modulation, Phase-Shift Keying, or other modulation.

Coding may be used to improve the integrity of communication. The coding may provide improved fault tolerance or resistance to transient errors, in exchange for a reduction in the information-carrying capacity of the channel due to coding overhead. Different forms of coding may be used to improve the reliability of the communication. For example, Forward Error Correction (FEC) may be used to correct errors caused by interference, thus allowing a reliable communication.

Figure 8A:
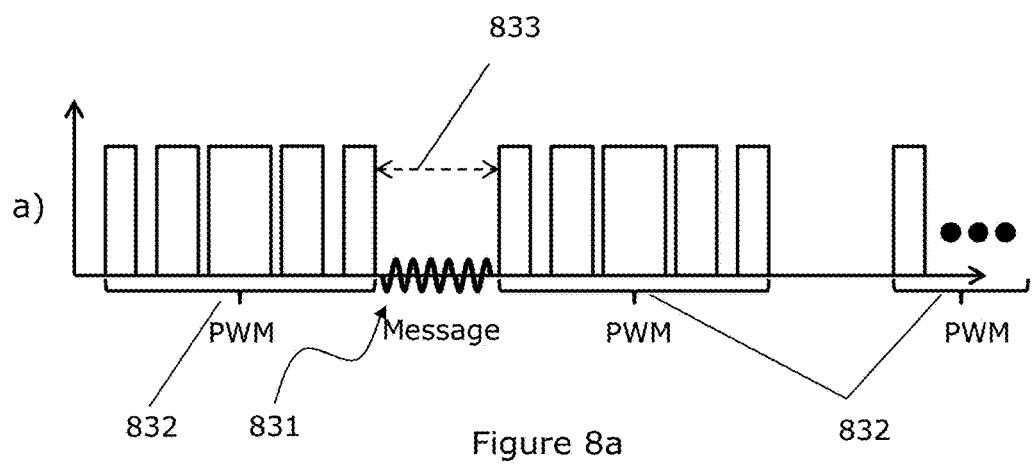
FIGS. 8a and 8b show signal and power modulation.

In an embodiment, the communications channel modulates onto the power supply line. In FIG. 8a is shown a modulation which occurs during pauses when power to the electric motor is not present. Power to drive the motor is shown as PWM bursts at 832. During pauses in the modulation 833, a message or datagram can be sent using power-line communication as 831.

Figure 8B:
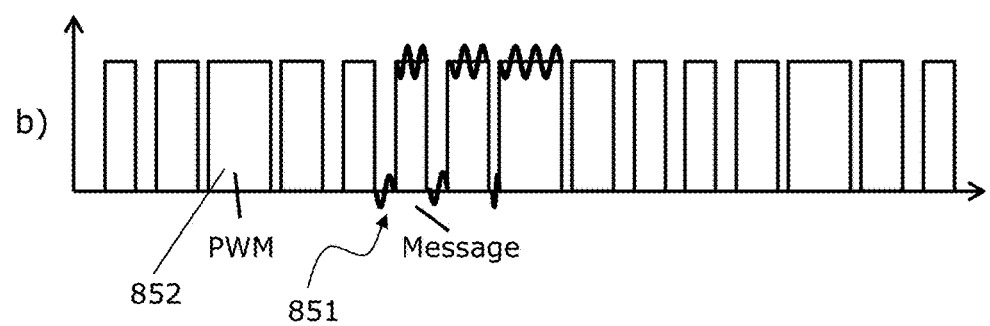

FIG. 8b shows an embodiment where the communications channel carries a message 851 concurrent to the PWM pulses 852. This implies a power-line communication scheme which is able to operate independent of potential interference caused by the PWM pulses.

Multiple drivers may communicate with one or more central controllers, and may share the bandwidth of the one or more channels used for communication. It may be advantageous for drivers to share channels, both to reduce the number of physical channels and to allow modularity in that additional drivers may be added without the need for an additional physical communications channel. The channels may be shared using frequency multiplexing, time multiplexing, or coding such as spread-spectrum, or any combination of these. Well-known methods for sharing include time-division multiple access (TMDA) and code-division multiple access (CDMA). The channel may use a temporal multiplex, such as Time-Division Multiple Access (TDMA), where different communications are assigned different timeslots, for example the first timeslot may be for broadcast communication from a first central controller, and the second timeslot for communication between central controller and a first actuator. If an interference has a limited duration, then timeslots may be used to avoid communicating during that interference. For example, a burst of electrical noise may be created when a motor starts, and thus one or more timeslots may intentionally be left unused during that burst of interference.

Figure 8C:
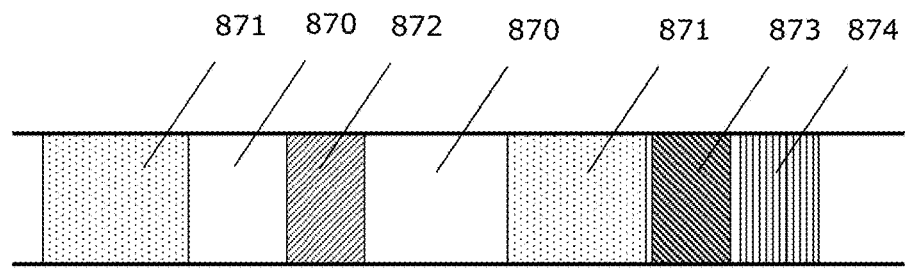
FIG. 8c shows datagrams.

FIG. 8c shows transmission through a communications channel over time, where datagrams of varying length or duration are sent. In one embodiment, a central controller may send a longer message or datagram 871, and different drivers may respond with shorter datagrams 872, 873, 874. There may also be pauses 870 where the communications channel is not used. The duration of a datagram may be fixed (not shown) or may be a multiple of a fixed duration. The communication may be organized with timeslots, where different actors which communicate are assigned specific times in which to send over the communications channel.

In an embodiment, the timeslots may be variable or movable. If an interference is anticipated, because e.g. a motor will start or stop, pauses may be planned for the duration of the interference. In another embodiment, communication may be scheduled such that less bandwidth may be needed when the channel has less capacity due to interference or attenuation.

In embodiments, the inverterization or drive algorithm within the inverter may be fully controlled by an embedded µController, so special attention can be paid to the noise pattern caused on the supply side of the actuator by pulling pulsed current which is transformed into PWM by the inverter. In order to improve communication quality over the supply lines, the PWM algorithm can try to minimize induced disturbance on the supply line and block a certain sideband for the required communication channel. This can be achieved either by an optimized PWM modulation scheme or by reserving certain time slots where the PWM is interrupted and a reduced noise environment can be granted for node-to-node communication between an application on the central controller and the different drivers or amongst the drivers themselves. The PWM modulation may also be optimized in a way that, depending on different load conditions on the motor side, the induced noise on the supply is controlled in a way that either the overall noise is reduced—and thus on a very broad frequency range a data transmission is possible—or noise in dedicated frequency areas/bands is reduced significantly so that data transmission in exactly these protected bands can happen with a very low disturbance. In this way, reliable communication can be insured.

Figure 9:
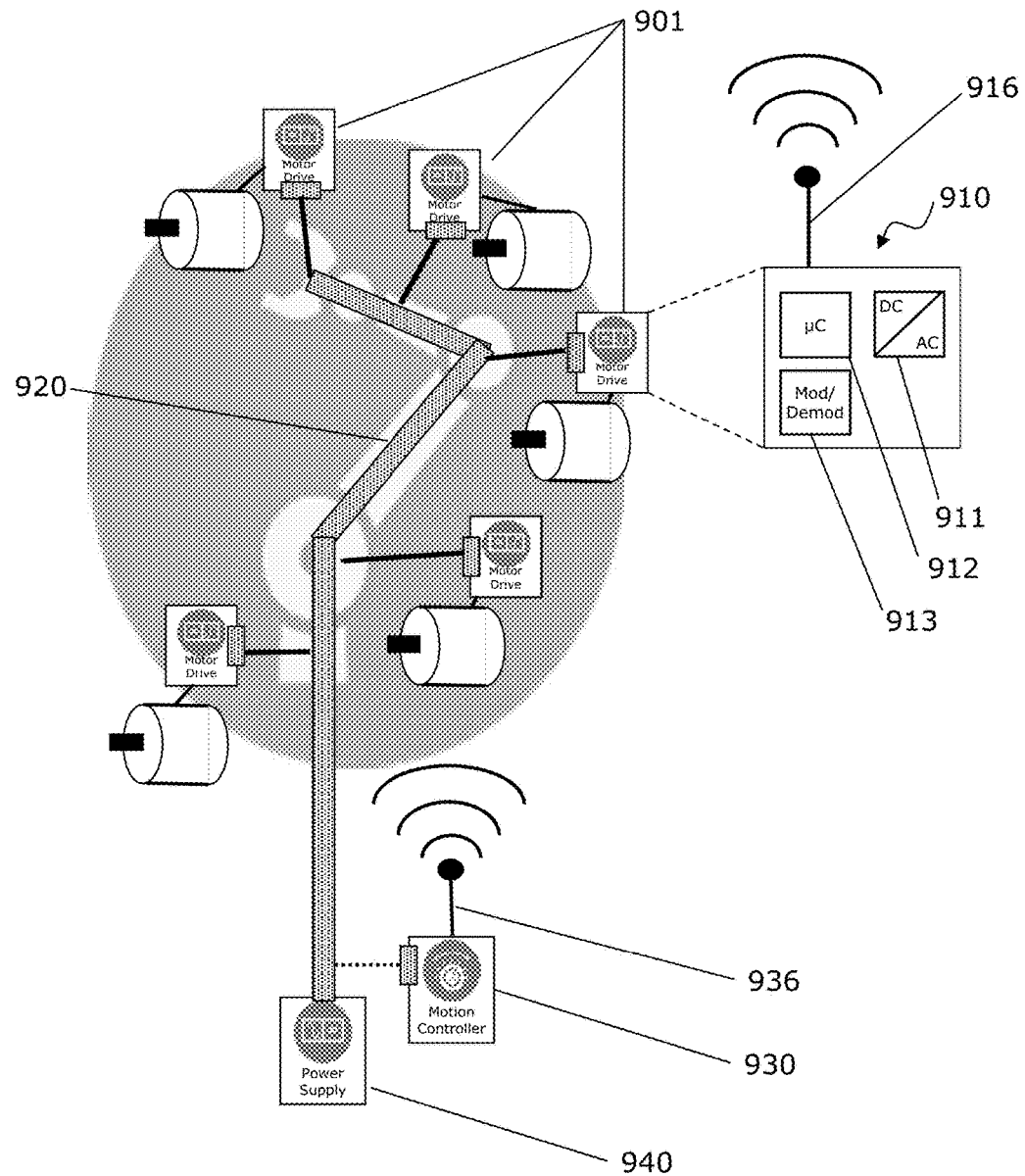
FIG. 9 shows an embodiment of a robotic system which uses wireless communication.

FIG. 9 shows an embodiment where two physical channels are available for communication. One channel is power-line communication over the power supply lines 920, and the other is wireless communication using antennas 916 and 936. In this embodiment the central controller 930 and drivers such as 910 must agree on which channel is used for communication. Communicating actors may have a fixed selection of which channel to use or may dynamically switch from one channel to the other. Communication between actors may always be across a shared channel, or there may be certain drivers which use one channel and others which use another channel. By way of example, if a wireless communication channel is being used and interference occurs from nearby arc welding, then those drivers which are active may switch to power-line communication, or all actors may switch to power-line communication.

Encryption may be part of some or all communication. Encryption may be desired or required in order to better insure the integrity of communication and control in the face of malicious actors.

In one embodiment, the encryption may use symmetric cryptography. Encryption such as AES or Triple-DES may be used. Communication sessions may be started using asymmetric cryptography, or communication may be started using known secret keys. The encryption may use a common key for all of a robotic system, or there may be separate sessions for separate drivers and central controllers.

The extendable robotic system described in embodiments above may serve as the basis for a configurable robotic system. In one embodiment, a manufacturing hub/factory replaces the traditional manufacturing line with single manufacturing devices which can be configured according to the task to be done. The modular robot approach in this embodiment would be the base for such a configurable manufacturing approach.

In one embodiment the configurable or modular robotic system may configure itself, or two neighboring systems may configure each other. This may be done according to the task the robotic system has to do. This embodiment may comprise "hot-plug" capable actuators. Such an embodiment may use a common DC bus and may benefit from the flexible configuration of the controllers. An embodiment may alternatively use an AC bus, which may bring an advantage in "hot-plug" actuators that there be less or no arcing when the actuator is connected to the electrical supply.

In one embodiment a wireless capability as shown in FIG. 9 may be used to identify actuators. In such an embodiment a selection of actuators may be available as interchangeable components for a robotic system. A central controller may be able to select the right part of the machine from a shelf (where the not currently used actuators are stored). In this embodiment a wireless connectivity may allow the identification of the right part, and may allow a central controller to check if an actuator is usable (any damage known/ maintenance required—e.g. drill bit is old, must be changed, etc.) and to install and adjust it properly in the robotic system. In an embodiment using power-line communication, the part may be identified by communication over the power supply bus.

In an embodiment with wireless communication there may be a possibility to register the new part or function in the combination of motors before the power supply of the robotic system is connected to the actuator. In this embodiment an actuator which is "on the shelf" or in storage may have an alternate power supply connection, in order to enable it to communicate wirelessly without being electrically connected to the robotic system.

In an embodiment the designer of a part to be produced may create two sets of data. The first set may be information on the configuration of the robotic system in order to accomplish the manufacture of the part to be produced (e.g. material metal, overall size xyz, CNC approach, holes to drill, additional plastics to be applied by 3D print approach) and how the machine would have to configure itself. The second set of data may be the raw design data which the machine uses to produce a part (exact dimensions and coordinates, sequence of steps, etc.)

In such an embodiment, both sets of data may be transferred to the factory. In order to insure that the design data cannot be misused by a third party which runs the factory, this data may be encrypted separately and differently from the machine configuration data, for example using a separate key. The machine configuration data may have to be broadly available, also outside of the workcell, for example for mechanics who work there to be able to do debugging in case of a problem. The raw design data, on the other hand, may have much more limited distribution, for example it may never leave the workcell, or may never leave the central controller, or may never leave a driver.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A robotic system, comprising:
an actuator;
an actuator driver configured to drive the actuator; and
at least one central controller configured to communicate with at least one actuator driver, including the actuator driver, across a communications channel, wherein the communications channel is subject to interference caused by the actuator, and wherein the at least one central controller is configured to modify at least one of a communication with the at least one actuator driver and an operation of the actuator prior to the interference occurring to reduce the interference.

2. The system of claim 1, wherein the communication is modified based on upcoming changes in the operation of the actuator.

3. The system of claim 1, wherein the operation of the actuator is modified based on upcoming communication requirements.

4. The system of claim 1, wherein the operation of the actuator is modified by delaying a starting or a stopping of a motor of the actuator or another actuator.

5. The system of claim 4, wherein the delay is of a predetermined duration.

6. The system of claim 1, wherein the operation of the actuator is modified by changing the operating parameters of a motor of the actuator or another actuator.

7. The system of claim 1, wherein the communication is modified by using at least one of selected frequencies or frequency ranges.

8. The system of claim 1, wherein the at least one central controller is configured to modify at least one of the communication with the at least one actuator driver and the operation of the actuator for a predetermined duration.

9. The system of claim 1, further comprising:
a power supply configured to supply power to the at least one actuator driver, wherein the communications channel and the power supply use at least one common wire.

10. The system of claim 1, wherein the communications channel uses encryption.

11. The system of claim 1, wherein the actuator driver is configured to indicate upcoming interference to the at least one central controller before activating a motor of the actuator or another actuator.

12. The system of claim 1, wherein the actuator driver is configured to communicate with another actuator driver using a shared communications channel.

13. A method of communicating in a robotic system subject to interference on at least one communications channel caused by at least one actuator, the method comprising:
anticipating the interference on the at least one communications channel; and
modifying at least one of a communication with the at least one actuator and an operation of at least one of the at least one actuator prior to the interference occurring to reduce the interference.

14. The method of claim 13, wherein the communication is modified by means of a pause in the communication for a predefined duration.

15. The method of claim 13, wherein the communication is modified by using at least one of selected frequencies or frequency ranges.

16. The method of claim 13, wherein the operation of the at least one of the at least one actuator is modified by delaying a starting or a stopping of a motor of the at least one of the at least one actuator or another actuator.

17. The method of claim 16, wherein a delay of the starting or the stopping is of a predetermined duration.

* * * * *